Nov. 20, 1962   R. T. BURNETT   3,064,763
AUXILIARY BRAKE APPLYING MECHANISM
Original Filed Nov. 4, 1954   2 Sheets-Sheet 1

INVENTOR.
RICHARD T. BURNETT
BY
Sheldon R. Rajes
ATTORNEY

INVENTOR.
RICHARD T. BURNETT
BY
Sheldon F. Raizes
ATTORNEY

United States Patent Office 3,064,763
Patented Nov. 20, 1962

3,064,763
AUXILIARY BRAKE APPLYING MECHANISM
Richard T. Burnett, South Bend, Ind., assignor to The Bendix Corporation, South Bend, Ind., a corporation of Delaware
Original application Nov. 4, 1954, Ser. No. 466,861, now Patent No. 2,953,220, dated Sept. 20, 1960. Divided and this application July 18, 1960, Ser. No. 43,606
4 Claims. (Cl. 188—72)

This invention relates to an auxiliary brake applying means and more particularly to a mechanically applied friction device adapted for use with a composite disk and shoe brake.

This is a division of parent case 466,861, filed November 4, 1954, now Patent No. 2,953,220.

An object of this invention is to obtain auxiliary brake applying means utilizable with rear wheel brakes of a construction similar to those illustrated and claimed in my co-pending application No. 392,177, now Patent No. 2,897,921.

A principal object of this invention is to obtain a combination of maximum parking brake effectiveness with the lowest possible lost motion in the applying linkages.

These objects and other objects and features of the invention will appear more fully hereinafter from a consideration of the following description taken in connection with the accompanying drawings wherein a plurality of embodiments of the invention are illustrated by way of example.

Figure 1:
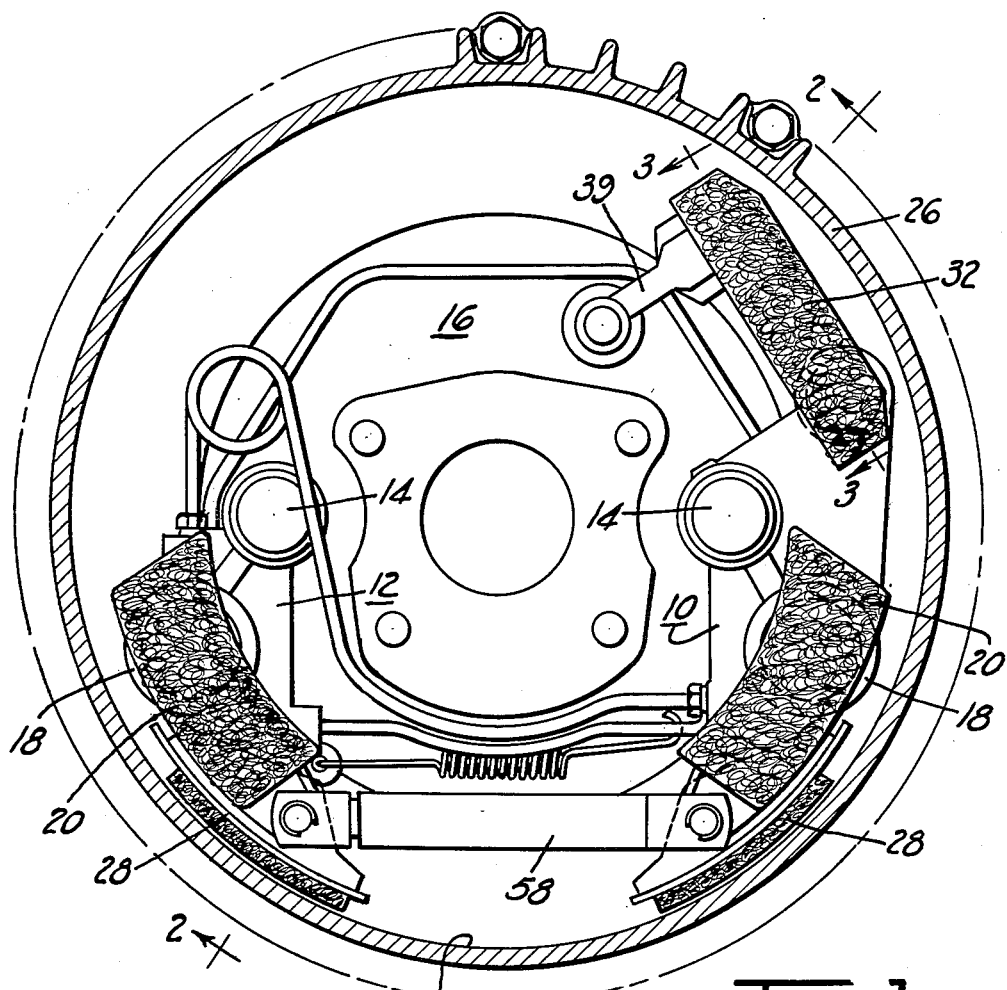
FIGURE 1 is a side elevation of a brake assembly with the invention incorporated therein.

This invention may be incorporated in the rear wheel brakes. The brake consists broadly of two friction units 10 and 12 which are pivotally supported on anchors 14. The anchors 14 are fastened to a torque plate 16 at opposite sides thereof.

Each of the friction units includes a fluid motor 18 which is arranged to produce spreading of friction elements 20 thereby forcibly engaging them with surfaces 22 and 24 of rotor 26. Each friction unit is further provided with a shoe element 28 engageable with surface 30 of the rotor. As will be explained more fully later in this description, application force on the shoe element 28 is derived from torque developed from engagement of the friction elements 20 with the surfaces 22 and 24 of the rotor. For further details of the rotor construction and friction unit construction refer to my copending applications No. 434,846, filed June 7, 1954, now abandoned, and No. 433,609, filed June 1, 1954, now Patent 2,927,664.

This invention is primarily concerned with auxiliary actuating means for mechanically applying the friction units 10 and 12. It is this feature which will next be explained in detail.

The auxiliary brake applying mechanism consists of a pair of oppositely applied friction members 32 and 34. These friction members are actuated by articulated levers 37 and 39 which are joined by pin 38. Lever 37 is fulcrumed at point 40 on the torque plate 16 through a ball-joint connection 42.

A flexible cable 44 is received through the ball joint connection by means of a passage 46 which is formed in the pivoted end of lever 37. The end of cable 44 is fastened to lever 39.

Figure 3:
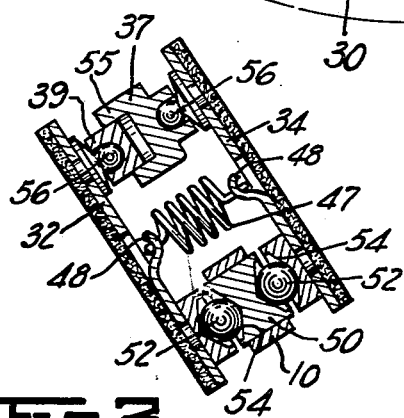
FIGURE 3 is a section view taken on line 3—3 of FIGURE 1.
Figure 2:
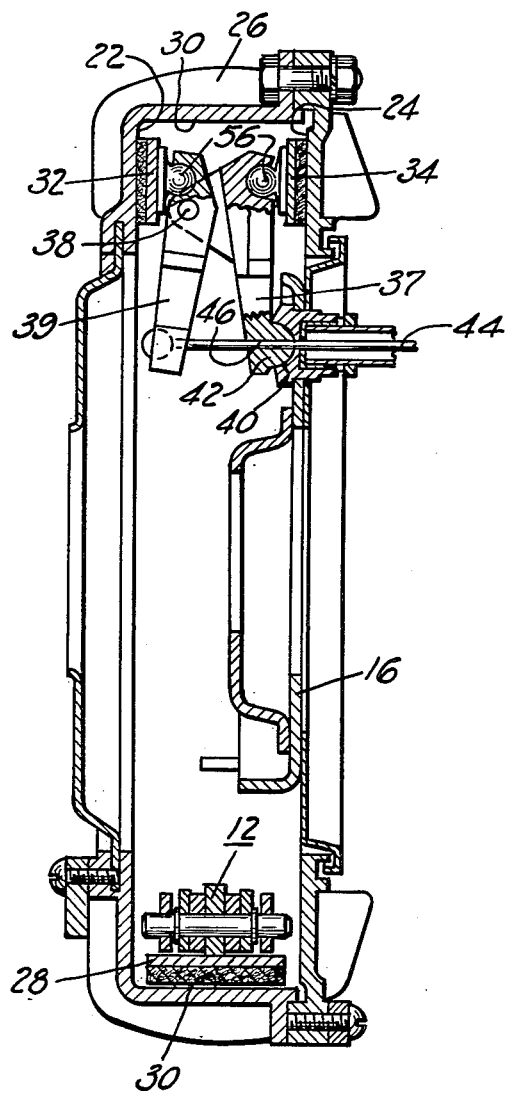
FIGURE 2 is a section view taken on line 2—2 of FIGURE 1.

A spring 47 is fastened between struck-up portions 48 in the friction members (see FIG. 3). The purpose of this spring is to maintain the friction members 32 and 34 in released position when the auxiliary brake applying mechanism is off.

The friction members 32 and 34 are connected to unit 10 through a camming device 50. The camming device assists in spreading the friction members and also imparts pivotal movement to the unit 10 when the friction members 32 and 34 shift with the rotor. The camming device 50 is formed of ball-ramp combinations 52, the ramps 54 being formed in the members 32, 34 and friction unit 10.

The levers 37 and 39 are pivoted, one in the other, at the pinned connection 38. This is best seen in FIGURE 3. The lever 37 has bifurcations 55 which receive therebetween a portion of lever 39. The pin 38 is then inserted through the bifurcations 55 and a portion of the lever 39 to join the two levers together.

The applying ends of levers 37 and 39 are connected to the friction members 32 and 34 through ball-socket joints 56, thus permitting swivelling movement between the applying ends of the levers and the friction members 32 and 34.

The shoe elements 28 of units 10 and 12 are interconnected by means of a suitable force transmitting member 58. The auxiliary brake is applied by pulling on the cable 44 to operate the levers 37 and 39. Pulling on the lever 39 causes it to turn on pin 38 thus exerting an applying force on the member 32 through the ball-socket joint 56. Friction member 32 is thus forcibly engaged with the surface 22 of the rotor. As the lever 39 is actuated, a reaction force is transmitted through the pin 38 to the lever 37 which is caused to turn on the ball-joint connection 42. The lever 37 thus exerts applying force on the member 34 through the ball-socket 56, forcibly engaging member 34 with surface 24 of the rotor.

Assuming that the vehicle moves in a direction causing the rotor to turn clockwise, the retarding force of members 32 and 34 on the rotor will be assisted by the shoe portion of unit 12. This is accomplished in the following manner: as the rotor moves clockwise this will produce shifting of the members 32 and 34 therewith. The articulated levers 37 and 39 turn on ball-joint 42 and swivel on the ball sockets 56 to permit shifting movement of the friction members. Shifting of the friction members produces pivotal movement of unit 10 in a clockwise direction about anchor 14. Any movement of the members 32 and 34 relative to the unit 10 causes further spreading of the members through the camming device 50. Clockwise turning of unit 10 about anchor 14 communicates applying effort to unit 12 through the force transmitting member 58, which induces clockwise movement of the unit 12 about anchor 14 thereby engaging the shoe element 28 of unit 12 with the surface 30 of the rotor.

If the vehicle should tend to move in a direction producing counterclockwise direction of rotor movement, the friction members 32 and 34 will tend to shift therewith in a like direction. The levers 37 and 39 turn on the ball joint connection 42 in a counterclockwise direction (referring to FIG. 1), and the levers 37 and 39 swivel at the applying ends thereof on ball-sockets 56. Shifting of the members 32 and 34 with the rotor causes counterclockwise movement of unit 10 on the anchor 14, thus applying the shoe portion thereof against surface 30 of the rotor. If members 32 and 34 should move relative to the friction unit 10, the camming devices 50 will cause further spreading of the friction members wedging them into tighter engagement with surfaces 22 and 24 of the rotor. It will be noted that vehicle movement in this direction is impeded by a combination of the retarding effort of friction members 32 and 34 and the shoe element 28 of unit 10.

Although this invention has been described in connection with only a single embodiment, it will be understood that various modifications will readily occur to those skilled in the art. Although only a single embodiment of the invention has been illustrated and described, various changes in the form and relative arrangements of the parts can be made to suit requirements and without departing from the principles of the invention.

I claim:

1. An auxiliary brake applying mechanism comprising oppositely acting friction members for engagement with opposed brake surfaces, a first lever having one end operatively connected to one of said friction members, a second lever having one end operatively connected to the other of said friction members and having a fulcrum on the other end, said fulcrum being swivelably mounted on its support surface, said levers being operatively connected to each other by a bearing connection intermediate the ends thereof on which said first lever pivots about the second lever upon actuation of said levers, said second lever rocking about said fulcrum upon actuation of said levers, each of said levers being actuatable in a plane transverse to the plane of said friction members and so constructed to apply said friction members into engagement with and produce pressure on said brake surfaces, said braking surfaces, said friction members and said levers being so constructed and arranged so that said levers will pivot as a unit about said swivable fulcrum about an axis transverse to said friction members when said friction members are moved by their respective braking surfaces, means for actuating said levers, and means urging said friction members in released position.

2. The structure as recited in claim 1 wherein said means for actuating said levers includes a cable extending through aligned openings in the fulcrum and the support surface therefor and is attached to the other end of said first lever.

3. The structure as recited in claim 1 wherein said one end of said levers are swivelably connected to their respective friction member.

4. The structure as recited in claim 1 wherein camming means is located between said friction members and operatively connected thereto, said camming means being constructed and arranged to effect a pressure in addition to that effected by said friction members on said braking surfaces when said friction members are moved by their respective braking surfaces.

References Cited in the file of this patent

UNITED STATES PATENTS

| | | |
|---|---|---|
| 2,174,398 | Farmer | Sept. 26, 1939 |
| 2,372,319 | Francois | Mar. 27, 1945 |
| 2,732,036 | Myers | Jan. 24, 1956 |